UNITED STATES PATENT OFFICE

WILLIAM C. HURD, OF NEW YORK, N. Y.

IMPROVED COMPOSITION FOR PAINT.

Specification forming part of Letters Patent No. 58,421, dated October 2, 1866.

*To all whom it may concern:*

Be it known that I, WILLIAM C. HURD, of New York city, in the State of New York, have invented a new and useful Combination of Materials for Making Paints; and I do hereby declare that the following is a full, clear, and exact description of the mode of compounding and preparing the same.

Take pure quartz, and first bake, and then grind to a fine powder resembling wheat-flour in appearance. This powdered quartz I mix with oil, lead, zinc, and other materials used in manufacturing paints, adding from ten to fifty per cent. of the quartz, according to circumstances, the proportion depending upon the nature of the materials with which it is mixed. Where the paint is to be exposed to a foul atmosphere, by which ordinary paints are discolored, I use a greater proportion of quartz.

I have ascertained from practical experiments that this mixes equally; absorbs more oil than other substances; that the paint thus compounded is very durable; that it resists atmospheric impurities, so that it is peculiarly adapted for painting ships, docks, &c.; and that it imparts a brilliancy of luster that is produced by no other mixture of paint with which I am acquainted.

What I claim as my invention, and desire to secure by Letters Patent, is—

A composition for painting compounded by the addition of powdered quartz to oil, lead, zinc, and other materials ordinarily employed in the manufacture of paints, substantially as set forth.

In testimony whereof I have signed my name to this specification in the presence of two subscribing witnesses.

WILLIAM C. HURD.

Witnesses:
J. B. NONES,
GEO. A. FROST.